United States Patent

[11] 3,631,259

[72] Inventor Kenmatu Kiyota
16-6, 2 chome, Nishiasa, kusa, Taito Ku, Tokyo, Japan
[21] Appl. No. 28,397
[22] Filed Apr. 14, 1970
[45] Patented Dec. 28, 1971

[54] APPARATUS FOR BOOSTING A DIRECT CURRENT VOLTAGE
7 Claims, 1 Drawing Fig.

[52] U.S. Cl. .................................................. 307/110, 320/1, 321/15
[51] Int. Cl. .................................................. H02m 3/06, H02m 3/08
[50] Field of Search .................................... 321/2, 15; 307/110; 320/1; 315/241

[56] References Cited
UNITED STATES PATENTS

| | | | |
|---|---|---|---|
| 2,631,249 | 3/1953 | Smith | 321/15 X |
| 2,975,353 | 3/1961 | Rockstuhl | 321/15 X |
| 3,470,443 | 9/1969 | Berry et al. | 321/2 |
| 3,497,792 | 2/1970 | Mlynar | 321/15 |

OTHER REFERENCES

" DC Converter Ckt Uses Capacitor" by J. M. Marzolf Electronics Mar. 21, 1966 pgs. 97, 98

Primary Examiner—Gerald Goldberg
Attorney—Young & Thompson

ABSTRACT: A plurality of rectifiers are connected in series from the positive terminal of a DC power source to one plate of an output capacitor which supplies a load. The opposite plate of the output capacitor is connected to the negative terminal of the power source. Capacitors are connected to the output of each rectifier and to a switch which selectively connects the capacitors to either the positive or negative side of the power source. The switch operates to accomplish successive switching operations, and when the capacitors connected to the outputs of the source are connected to the positive power source terminal, the remaining rectifier output capacitors are connected to the power source negative terminal. The switch operates to successively change these reverse relationships.

PATENTED DEC 28 1971
3,631,259
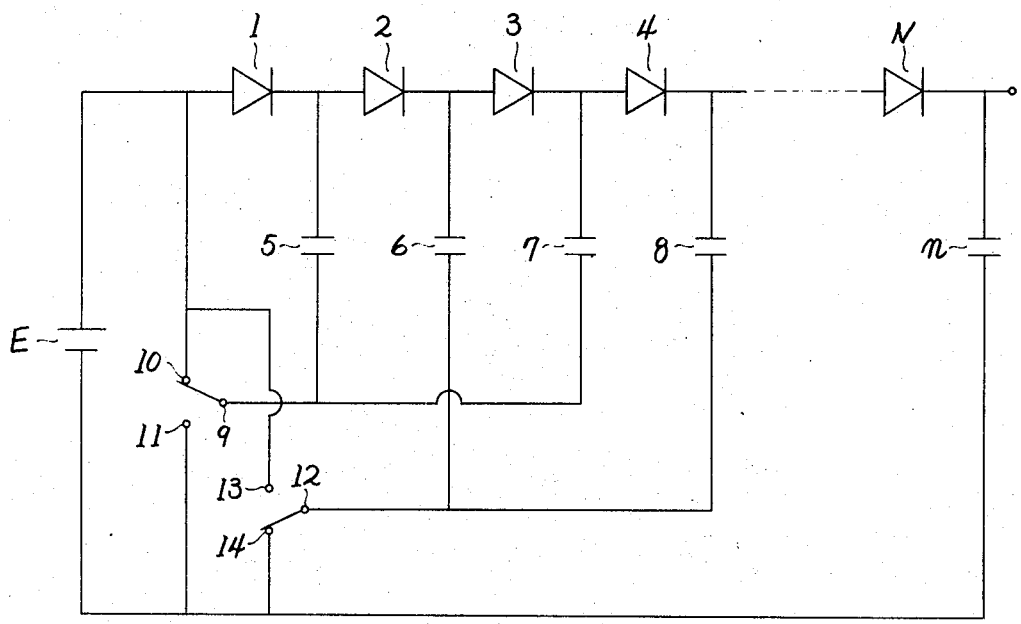
INVENTOR
KENMATU KIYOTA
BY Young & Thompson
ATTORNEYS

APPARATUS FOR BOOSTING A DIRECT CURRENT VOLTAGE

BACKGROUND OF THE INVENTION

This invention relates to a boosting method and circuit for transforming low voltage DC power to high voltage DC.

In order to convert a low DC voltage to a higher DC voltage, conventional conversion units have employed an oscillator-transformer combination wherein the oscillator circuit is operated by the DC power to be boosted. This transforms the low voltage DC into an AC current which is boosted or stepped up by the transformer and then transformed back into the DC current. In such circuits, the transformer is made of steel, iron and the like of high weight, volume and heating loss and the oscillator is limited in electric capacity and voltage, thus providing low operational stability.

It is a primary object of the present invention to obtain a high voltage DC output from a low DC voltage input with high efficiency and stability by utilizing simple electronic devices of small size and weight to solve the defects of the prior art. For this purpose, a plurality of rectifiers are connected in series from a DC power source and are connected in series to one plate of a capacitor. The other plate of the capacitor is selectively connected to the outputs of either the odd- or even-numbered rectifiers extending from the positive side of the power source by suitable mechanical or electronic switching means.

BRIEF DESCRIPTION OF THE DRAWING

This invention will be clearly understood from the following specification taken in view of the accompanying drawing in which;

The single FIGURE illustrates a circuit diagram of the conversion circuit of the present invention.

PREFERRED EMBODIMENT OF THE INVENTION

Referring to the drawing, the conversion circuit of the present invention includes a plurality of rectifiers 1, 2, 3, 4 ....N connected in series from the positive side of a DC power source E. The output of the last rectifier N is connected to one side of a capacitor $n$; the opposite side of the capacitor being connected to the negative terminal of the power source E.

Capacitors 5 and 7 are connected between the outputs of the odd numbered rectifiers 1 and 3 respectively and a switch arm 9 while capacitors 6 and 8 are connected between the outputs of even-numbered rectifiers 2 and 4 respectively and a switch arm 12. If more rectifiers are provided in the series circuit between the rectifiers 4 and N, the same capacitor circuit configuration will be followed with all capacitors connected to the outputs of the even-numbered rectifiers being electrically connected to switch arm 12 while those connected to the outputs of the odd-numbered rectifiers are similarly connected to switch arm 9.

The switch arm 9 is positioned to selectively complete a circuit to either a terminal 10 or a terminal 11; such terminals being provided in a line connected across the power source E to points between the power source, the capacitor $n$ and the input to rectifier 1. Similarly, the switch arm 12 is positioned to selectively complete a circuit to either a terminal 13 or a terminal 14. The terminals 13 and 14 are also provided in a circuit connected across the power source E between the power source, the capacitor $n$ and the input to the rectifier 1.

The switch arms 9 and 12 are interconnected in such a manner that when the arm 9 contacts the terminal 10, the arm 12 contacts the terminal 14. Similarly, when the arm 9 contacts the terminal 11, the arm 12 contacts the terminal 13. Thus when the arm 9 is connected through the contact 10 to the positive side of the power source E, the arm 12 is connected through the terminal 14 to a point between the negative side of the power source and the capacitor $n$. The reverse occurs when the arm 9 contacts the terminal 11.

If the switch arm 9 is connected to the contact 11, electric current is introduced from the power source E through the rectifiers 1, 2 and 3 to the capacitors 5 and 7, and the capacitors charge to a voltage level 1 ev. However, if the switch arm 9 is now connected to the contact 10, the switch arm 12 is connected to the contact 14 and the electric current flow from the power source E through the rectifier 1 will initially be blocked due to the charge on capacitor 5. However the electric charge previously stored in the capacitor 5 is now supplied through the rectifiers 2, 3 and 4 to the capacitors 6 and 8, and the source E operates with the charge from the capacitor 5 to bring the charge on the capacitor 6 to approximately 2 ev. and thus about twice as high as that of the power source E.

When the switch arms 12 and 9 are next connected to the contacts 13 and 11 respectively, the power source E is connected to the capacitor 5 and the electric charge stored in the capacitor 6 flows to the capacitor 7. The capacitor 5 recharges and the source E operates with the charge from the capacitor 6 to charge the capacitor 7 to a voltage of approximately 3 ev.

Similarly, a voltage of approximately 4 ev. is stored in the capacitor 8 when the switch arms 9 and 12 are subsequently switched between the contacts 10 and 14 and 11 and 13 respectively. Thus, the voltage stored in the final capacitor $n$ will increase by integral steps according to the number of the capacitors and rectifiers employed.

As is apparent from the foregoing, the switch arms 9 and 12 are capable of successive switching, so that the voltage is stored with stability in the final capacitor $n$, even though a load is connected to said capacitor. Obviously, the mechanical switches illustrated can be replaced by known electrical switching units such as transistor switches which may be electrically controlled. Mechanical switches have been illustrated for simplicity of description.

It is necessary that the respective capacitors 5-8 be arranged in order from the higher value capacitors to the lower value capacitors; that is, the capacitor 5 > the capacitor 6 and the capacitor 6 > the capacitor 7, since the voltage cannot be boosted up to the same capacity of respective capacitors. However, a number of switching operations permits the voltage boost.

As is described hereinabove, the method of this invention makes it possible to store a voltage several times that of the power source E in the final capacitor $n$. This provides a wide range of applications, such as for cell transistors radios, wireless telegraph, high voltage power sources, industrial meters and the like.

More particularly, this method provides great advantages in that the circuit is portable and uses fewer components because there is no need to obtain an AC current from the DC source. Further, this circuit simply uses a rectifier-capacitor combination to increase voltage because of the alternate switching operation of the two switches, thus providing high efficiency.

I claim:

1. An apparatus for boosting the DC voltage from a DC power supply comprising a plurality of rectifiers connected in series to said power supply to pass current from said power supply, said series of rectifiers including at least a first and a second rectifier, each having an input and an output, the input of said first rectifier being connected to the positive side of said power supply and the output thereof to the input of said second rectifier, a first and second capacitor, each having a first and second terminal, the first terminal of said first capacitor being connected to the output of said first rectifier and the first terminal of said second capacitor being connected to the output of said second rectifier, and switching means connected between the second terminals of said first and second capacitors and said power source, said switching means being operative in a first state to simultaneously connect the second terminal of said first capacitor to the negative side of said power supply and the second terminal of said second capacitor to the positive side of said power supply and in a second state to simultaneously connect the second terminal of said first capacitor to the positive side of said power supply and the second terminal of said second capacitor to the negative side of said power supply.

2. The apparatus of claim 1 wherein said second capacitor is adapted to store a charge greater than that stored by said first capacitor.

3. The apparatus of claim 2 wherein a third rectifier is connected in series with said first and second rectifiers and a load capacitor is connected between the output of said third rectifier and the negative side of said power supply.

4. The apparatus of claim 2 wherein said switching means includes a first switching circuit connected across said power supply, said first switching circuit including a first switch terminal connected to the positive side of said power supply, a second switch terminal spaced from said first switch terminal and connected to the negative side of said power supply, and a first switch arm connected to the second terminal of said first capacitor and adapted to selectively connect said terminal to either said first or second switch terminals a second switching circuit connected across said power supply, said second switching circuit including a third switch terminal connected to the positive side of said power supply, a fourth switch terminal spaced from said third switch terminal and connected to the negative side of said power supply, and a second switch arm connected to the second terminal of said second capacitor and adapted to selectively connect said second terminal to either said third or fourth switch terminals, and means coupling said first and second switch arms, said coupling means operating to cause said second switch arm to contact said third switch terminal when said first switch arm contacts said second switch terminal and to contact said fourth switch terminal when said first switch arm contacts said first switch terminal.

5. The apparatus of claim 1 wherein said plurality of rectifiers connected in series includes the first of said series of rectifiers having an input connected to a positive side of said power supply and an output connected to a first terminal of said first capacitor, the output of each subsequent rectifier being connected to a first terminal of a capacitor each said capacitor having a second terminal connected to said switching means, said switching means operating in said first state to connect the second terminals of the capacitors connected to the outputs of odd-numbered rectifiers beginning with said first rectifier to the negative side of said power supply and to simultaneously connect the second terminals of the capacitors connected to the outputs of even-numbered rectifiers to the positive side of said power supply and in said second state to connect the second terminals of the capacitors connected to the outputs of odd-numbered rectifiers to the positive side of said power supply and to simultaneously connect the second terminals of the capacitors connected to the outputs of even-numbered rectifiers to the negative side of said power supply.

6. The apparatus of claim 5 wherein an output rectifier is connected in series with the last rectifier of said rectifier means and a load capacitor is connected between the output of said output rectifier and the negative side of said power supply.

7. The apparatus of claim 6 wherein said switching means is connected across said power supply at points between the input to said first rectifier and the positive side of said power supply and said output capacitor and the negative side of said power supply.

* * * * *